(12) United States Patent
El Ayach et al.

(10) Patent No.: US 9,331,760 B2
(45) Date of Patent: May 3, 2016

(54) METHOD AND APPARATUS FOR LEVERAGING SPATIAL/LOCATION/USER INTERACTION SENSORS TO AID IN TRANSMIT AND RECEIVE-SIDE BEAMFORMING IN A DIRECTIONAL WIRELESS NETWORK

(71) Applicant: QUALCOMM Incorporated, San Diego, CA (US)

(72) Inventors: Omar El Ayach, San Diego, CA (US); Sundar Subramanian, Bridgewater, NJ (US); John Edward Smee, San Diego, CA (US); Ashwin Sampath, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/289,435

(22) Filed: May 28, 2014

(65) Prior Publication Data

US 2015/0349863 A1    Dec. 3, 2015

(51) Int. Cl.
*H04L 27/00* (2006.01)
*H04B 7/04* (2006.01)
*H04W 8/02* (2009.01)
*H04B 7/08* (2006.01)
*H04W 56/00* (2009.01)
*H01Q 1/00* (2006.01)
*H04W 16/28* (2009.01)

(52) U.S. Cl.
CPC ............. *H04B 7/0456* (2013.01); *H01Q 1/00* (2013.01); *H04B 7/0404* (2013.01); *H04B 7/0408* (2013.01); *H04B 7/0834* (2013.01); *H04W 8/02* (2013.01); *H04W 16/28* (2013.01); *H04W 56/001* (2013.01)

(58) Field of Classification Search
CPC ......... H01Q 3/04; H01Q 21/205; H01Q 1/00; H04B 7/0404; H04B 7/0408; H04W 16/28
USPC .................... 375/267, 295; 370/252; 343/762
See application file for complete search history.

(56) References Cited

U.S. PATENT DOCUMENTS

| 8,525,868 B2 | 9/2013 | Forutanpour et al. |
| 2012/0064841 A1* | 3/2012 | Husted et al. ................... 455/78 |

(Continued)

FOREIGN PATENT DOCUMENTS

| WO | 2012033713 A1 | 3/2012 |
| WO | 2012143936 A1 | 10/2012 |

(Continued)

OTHER PUBLICATIONS

International Search Report and Written Opinion—PCT/US2015/028923—ISA/EPO—Aug. 10, 2015.

*Primary Examiner* — Leila Malek
(74) *Attorney, Agent, or Firm* — Arent Fox LLP

(57) ABSTRACT

A method, an apparatus, and a computer program product for wireless communication are provided. The apparatus is embodied in a device that determines a first set of antenna weights for communicating a first communication ray, detects a change in a physical orientation of the device, determines a mapping between the first set of antenna weights, the detected change in the physical orientation, and a second set of antenna weights for communicating a second communication ray, communicates the second communication ray based on the second set of antenna weights.

30 Claims, 9 Drawing Sheets

(56) References Cited

U.S. PATENT DOCUMENTS

2012/0172096 A1* 7/2012 Samardzija et al. ....... 455/575.7
2012/0185246 A1 7/2012 Zhang et al.
2015/0141026 A1* 5/2015 Jover ......................... 455/452.1

FOREIGN PATENT DOCUMENTS

| | | |
|---|---|---|
| WO | 2012176217 A1 | 12/2012 |
| WO | 2013023187 A1 | 2/2013 |
| WO | 2013028171 A1 | 2/2013 |

* cited by examiner

METHOD AND APPARATUS FOR LEVERAGING SPATIAL/LOCATION/USER INTERACTION SENSORS TO AID IN TRANSMIT AND RECEIVE-SIDE BEAMFORMING IN A DIRECTIONAL WIRELESS NETWORK

BACKGROUND

1. Field

The present disclosure relates generally to communication systems, and more particularly, to utilizing sensor information and a physical orientation of a device to assist multiple antenna beamforming processes performed at the device.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus for wireless communication are provided. The apparatus may be embodied in a device that determines a first set of antenna weights for communicating a first communication ray, detects a change in a physical orientation of the device, determines a mapping between the first set of antenna weights, the detected change in the physical orientation, and a second set of antenna weights for communicating a second communication ray, and communicates the second communication ray based on the second set of antenna weights

DETAILED DESCRIPTION

Figure 1:
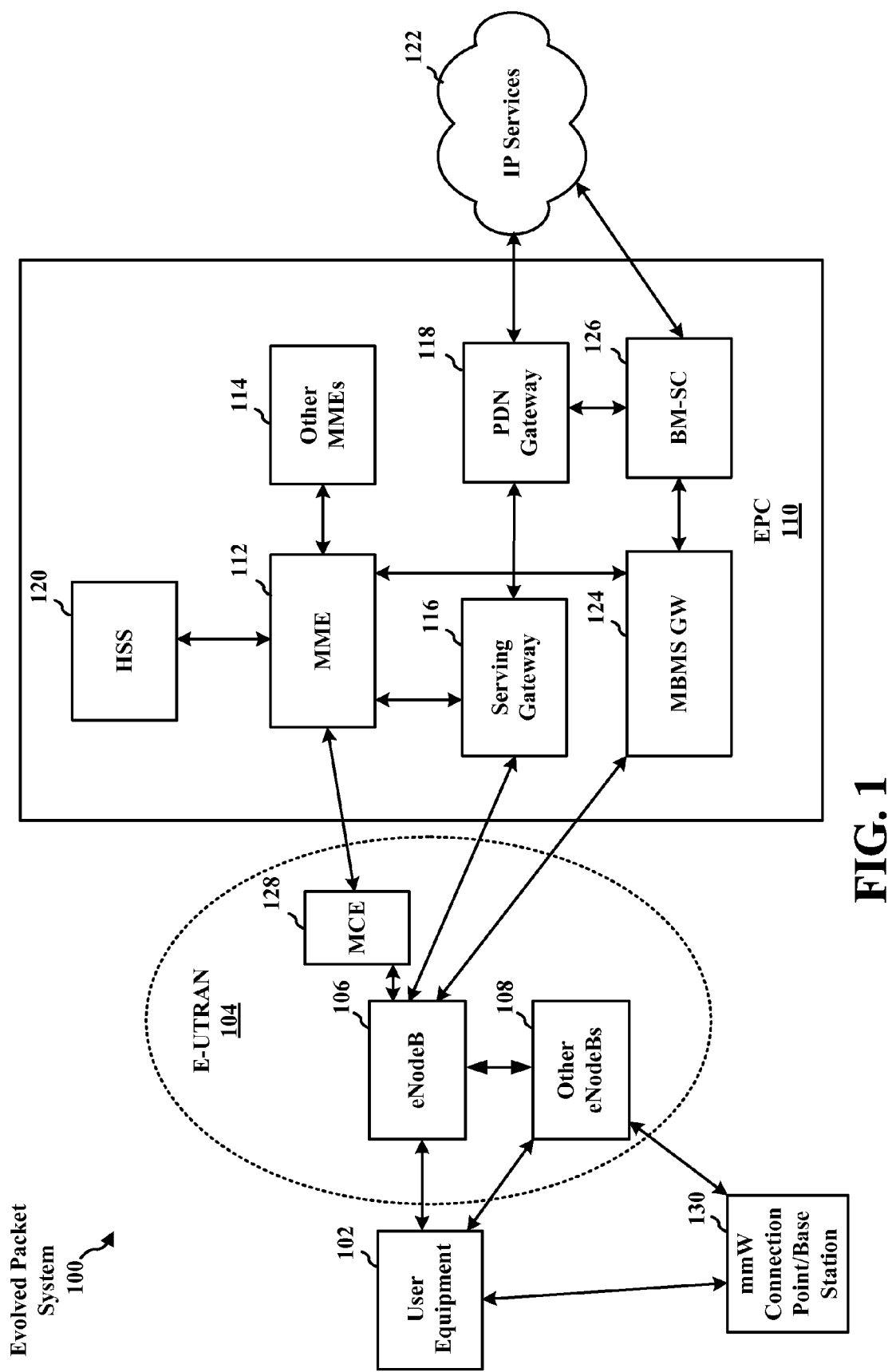
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media.

Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

In an aspect, the UE 102 is capable of communicating signals via the LTE network and a millimeter wave (mmW) system. Accordingly, the UE 102 may communicate with the eNB 106 and/or the other eNBs 108 over a LTE link. Additionally, the UE 102 may communicate with a connection point (CP) or base station (BS) 130 (capable of mmW system communication) over a mmW link.

In a further aspect, at least one of the other eNBs 108 may be capable of communicating signals via the LTE network and the mmW system. As such, an eNB 108 may be referred to as a LTE+mmW eNB. In another aspect, the CP/BS 130 may be capable of communicating signals via the LTE network and the mmW system. As such, the CP/BS 130 may be referred to as a LTE+mmW CP/BS. The UE 102 may communicate with the other eNB 108 over a LTE link as well as over a mmW link.

In yet another aspect, the other eNB 108 may be capable of communicating signals via the LTE network and the mmW system, while the CP/BS 130 is capable of communicating signals via the mmW system only. Accordingly, the CP/BS 130 unable to signal the other eNB 108 via the LTE network may communicate with the other eNB 108 over a mmW backhaul link. Discovery techniques in a directional wireless network such as EPS 100 between a UE 102 and CP 130 is discussed in further detail infra.

Figure 2:
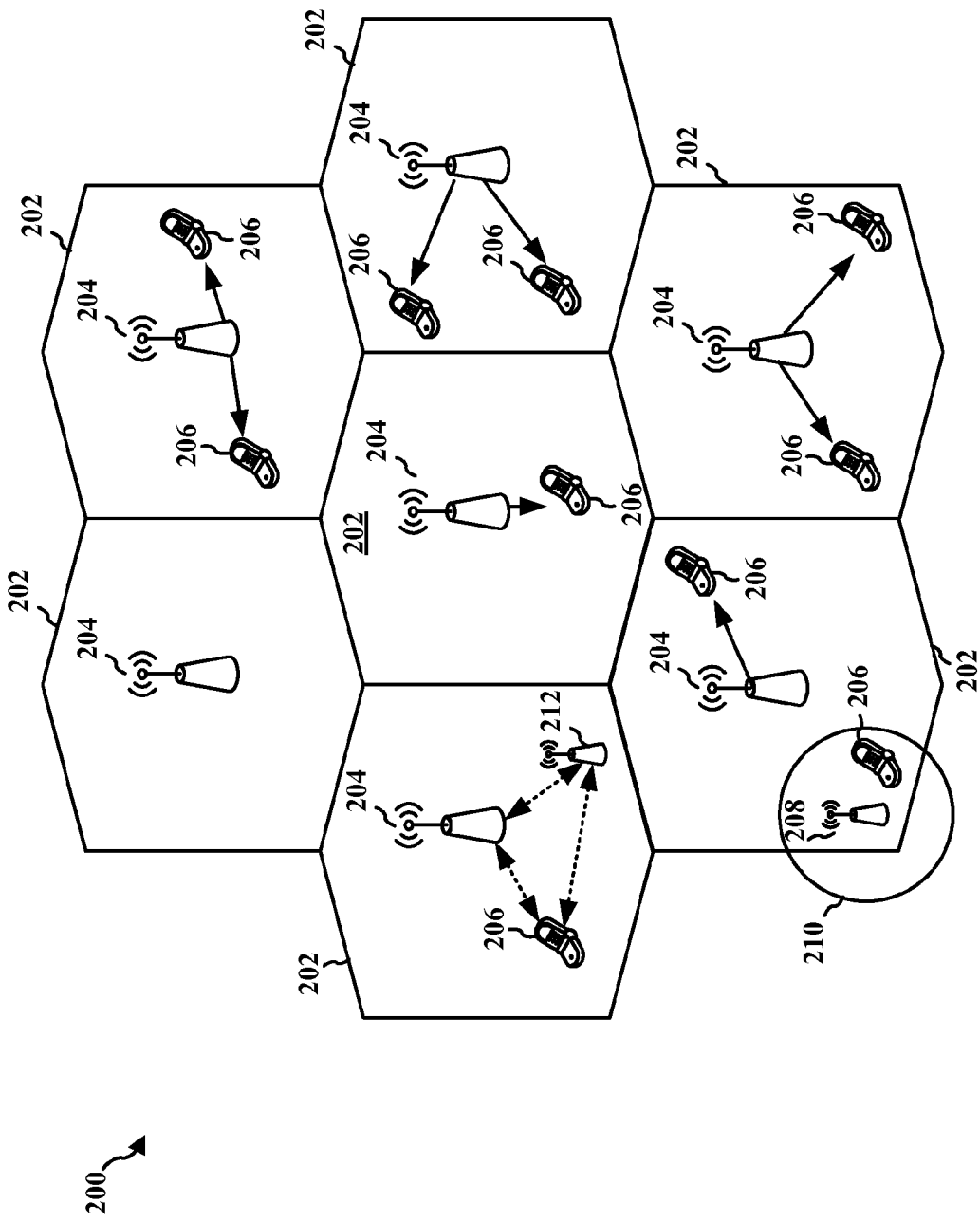
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

In an aspect, the UE 206 may communicate signals via the LTE network and a millimeter wave (mmW) system. Accordingly, the UE 206 may communicate with the eNB 204 over a LTE link and communicate with a connection point (CP) or base station (BS) 212 (capable of mmW system communication) over a mmW link. In a further aspect, the eNB 204 and the CP/BS 212 may communicate signals via the LTE network and the mmW system. As such, the UE 206 may communicate with the eNB 204 over a LTE link and a mmW link (when the eNB 204 is capable of mmW system communication), or communicate with the CP/BS 212 over a mmW link and a LTE link (when the CP/BS 212 is capable of LTE network communication). In yet another aspect, the eNB 204 communicates signals via the LTE network and the mmW system, while the CP/BS 212 communicates signals via the mmW system only. Accordingly, the CP/BS 212 unable to signal the eNB 204 via the LTE network may communicate with the eNB 204 over a mmW backhaul link.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
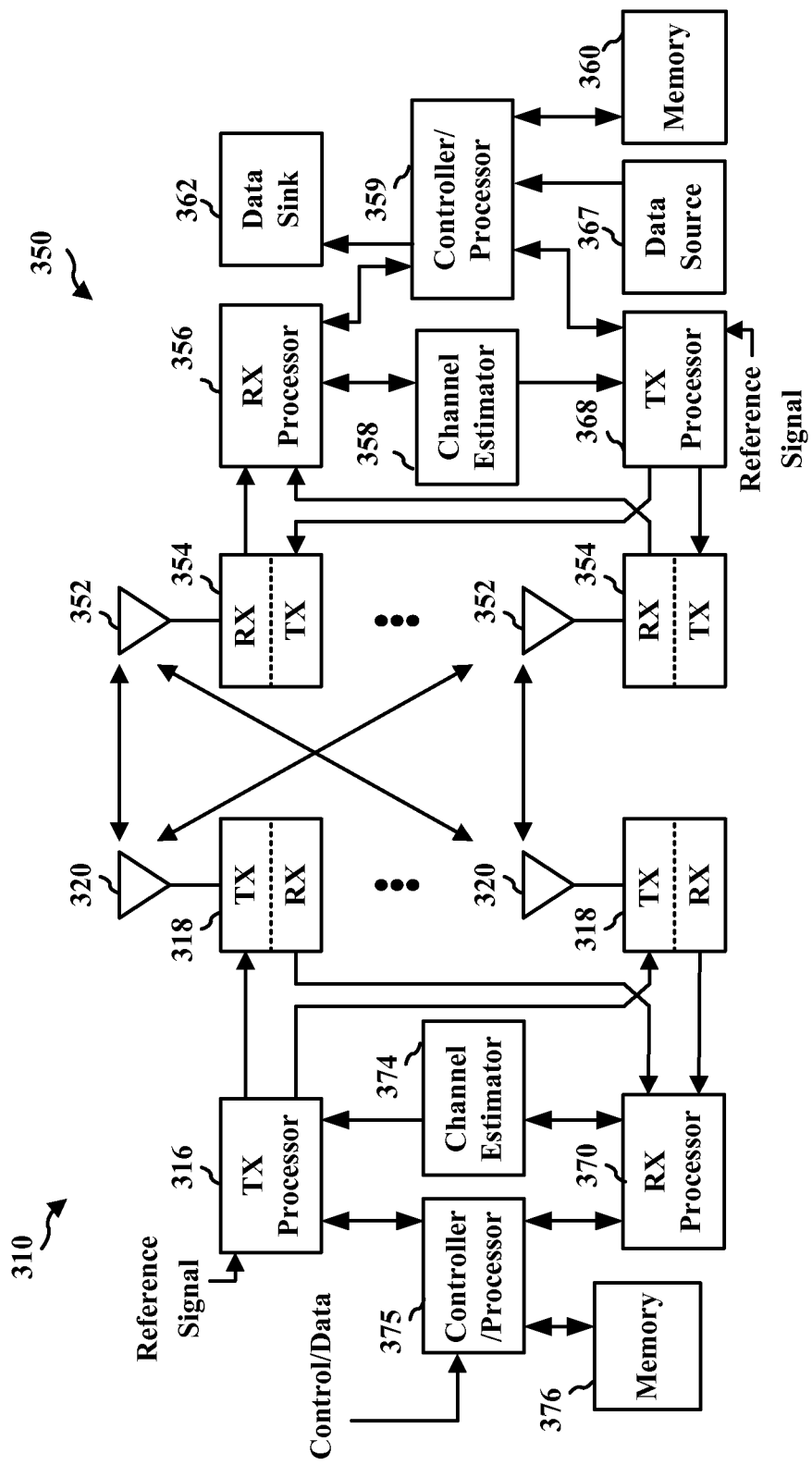
FIG. 3 is a diagram illustrating an example of an evolved Node B and user equipment in an access network.

FIG. 3 is a block diagram of an eNB 310 in communication with a UE 350 in an access network. In the DL, upper layer packets from the core network are provided to a controller/processor 375. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions. The signal processing functions include coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362. Various control signals may also be provided to the data sink 362 for processing. The controller/processor 359 is also responsible for error detection using an acknowledgement (ACK) and/or negative acknowledgement (NACK) protocol to support HARQ operations.

In the UL, a data source 367 is used to provide upper layer packets to the controller/processor 359. Similar to the functionality described in connection with the DL transmission by the eNB 310, the controller/processor 359 provides header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the control/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

A motivation for LTE is to increase a cellular network bandwidth for a mobile data demand. As the mobile data demand increases, various other technologies may be utilized to sustain the demand. For example, high speed mobile data may be delivered using a millimeter wave (mmW) channel.

A mmW link may be defined as the delivery of baseband symbols from a transmitter capable of mmW beamforming to a receiver capable of mmW beamforming. A mmW resource unit may include a specific combination of a beam width, a beam direction, and a timeslot. The timeslot may be a fraction of a LTE subframe and aligned with a LTE physical downlink control channel (PDCCH) frame timing. To effectively increase a receive mmW signal strength without increasing transmission power at the transmitter, beamforming may be applied. A receiver gain may be increased by reducing the mmW beam width of either, or both, the transmitter and the receiver. For example, the beam width may be changed by applying phase shifting to an antenna array.

A mmW communication system may operate at very high frequency bands (e.g., 10 GHz to 300 GHz). Such high carrier frequencies allow for the use of large bandwidth. For example, a 60 GHz mmW wireless network provides large bandwidth at approximately a 60 GHz frequency band and has the ability to support a very high data rate (e.g., up to 6.7 Gbps). The very high frequency bands may be used for backhaul communications or for network access (e.g., UEs accessing a network), for example. Applications supported by the mmW system may include uncompressed video streaming, sync-n-go file transfer, video games, and projections to wireless displays, for example.

A mmW system may operate with the help of a number of antennas and beamforming to overcome a channel having low gain. For example, heavy attenuation at high carrier frequency bands may limit a range of a transmitted signal to a few meters (e.g., 1 to 3 meters). Also, the presence of obstacles (e.g., walls, furniture, human beings, etc.) may block the propagation of a high frequency millimeter wave. As such, propagation characteristics at the high carrier frequencies necessitate the need for beamforming to overcome the loss. Beamforming may be implemented via an array of antennas (e.g., phased arrays) cooperating to beamform a high frequency signal in a particular direction to receiving devices, and therefore, extend the range of the signal. While the mmW system may operate in a stand-alone fashion, the mmW system may be implemented in conjunction with more established but lower frequency (and lower bandwidth) systems, such as LTE.

In an aspect, the present disclosure provides for cooperative techniques between the LTE system and the mmW system. For example, the present disclosure may exploit the presence of a more robust system to help with beamforming, synchronization, or discovery of a base station. Cooperation between the mmW system and a lower-frequency system (e.g., LTE) may be facilitated by the following: 1) Types of signaling in support of discovery, synchronization, or association on a mmW channel can be sent over a different lower-frequency robust carrier; 2) Order of sending discovery and synchronization signaling between a mmW channel and a lower-frequency carrier (e.g., LTE); 3) Exploitation of existing connectivity; 4) Information to be included by base stations (BSs)/user equipments (UEs) in a transmitted message; and 5) Information to be included in LTE signaling.

In an aspect, mmW-capable connection points (CPs) or base stations (BSs) (network access points for mmW-capable devices) may be mounted on light poles, building sides, and/or collocated with metro cells. A mmW link may be formed by beamforming along a line of sight (LOS) or dominant reflected paths or diffracted paths around obstacles. A challenge of a mmW-capable device is to find an appropriate LOS or reflected path for beamforming.

Figure 4A:
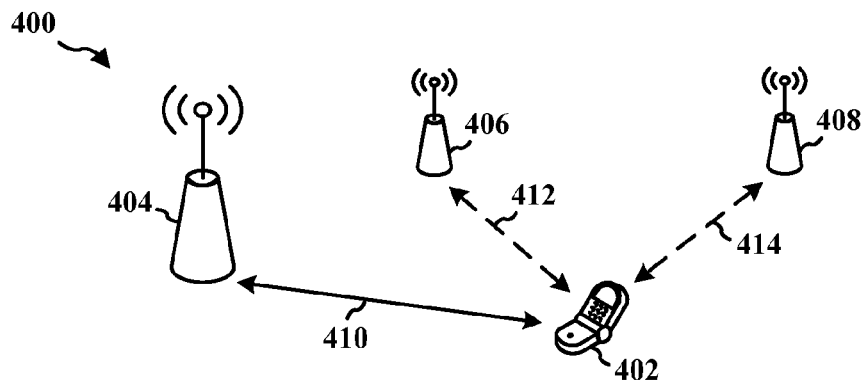
FIGS. 4A to 4C are diagrams illustrating example deployments of a mmW system used in conjunction with a LTE system.
Figure 4B:
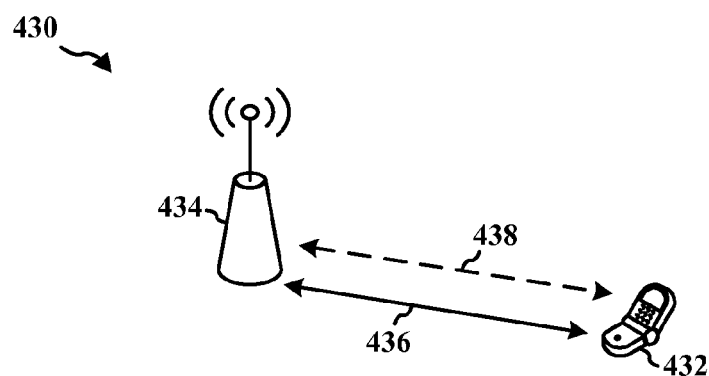
Figure 4C:
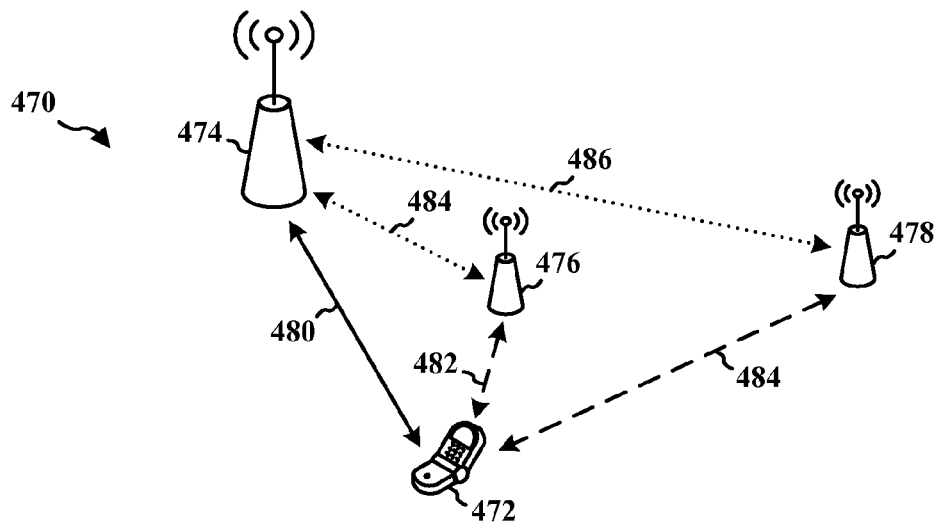

FIGS. 4A to 4C are diagrams illustrating example deployments of a mmW system used in conjunction with a LTE system. In FIG. 4A, diagram 400 illustrates a deployment where a LTE system operates independently of, and in parallel with, a mmW system. As shown in FIG. 4A, a UE 402 is capable of communicating signals via a LTE system and a mmW system. Accordingly, the UE 402 may communicate with a eNB 404 over a LTE link 410. In parallel with the LTE link 410, the UE 402 may also communicate with a first BS 406 over a first mmW link 412 and communicate with a second BS 408 over a second mmW link 414.

In FIG. 4B, diagram 430 illustrates a deployment where the LTE system and the mmW system are collocated. As shown in FIG. 4B, a UE 432 is capable of communicating signals via the LTE system and the mmW system. In an aspect, a BS 434 may be an LTE eNB capable of communicating signals via the LTE system and the mmW system. As such, the BS 434 may be referred to as a LTE+mmW eNB. In another aspect, the BS 434 may be a mmW CP capable of communicating signals via the LTE system and the mmW system. As such, the BS 434 may be referred to as a LTE+mmW BS. The UE 432 may communicate with the BS 434 over a LTE link 436. Meanwhile, the UE 432 may also communicate with the BS 434 over a mmW link 438.

In FIG. 4C, diagram 470 illustrates a deployment where a BS capable of communicating signals via the LTE system and the mmW system (LTE+mmW base station) is present with BSs capable of communicating signals via the mmW system only. As shown in FIG. 4C, a UE 472 may communicate with a LTE+mmW BS 474 over a LTE link 480. The LTE+mmW BS 474 may be a LTE+mmW eNB. In parallel with the LTE link 480, the UE 472 may also communicate with a second BS 476 over a first mmW link 482 and communicate with a third BS 478 over a second mmW link 484. The second BS 476 may further communicate with the LTE+mmW BS 474 over a first mmW backhaul link 484. The third BS 478 may further communicate with the LTE+mmW BS 474 over a second mmW backhaul link 486.

Figure 5A:
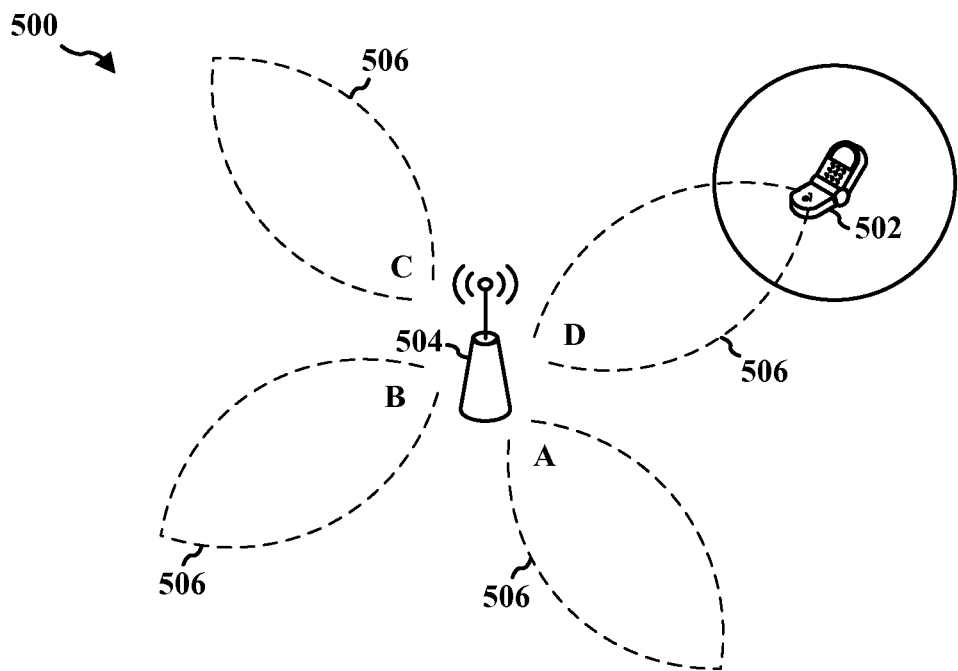
FIGS. 5A and 5B are diagrams illustrating an example of the transmission of beamformed signals between a connection point and a UE.
Figure 5B:
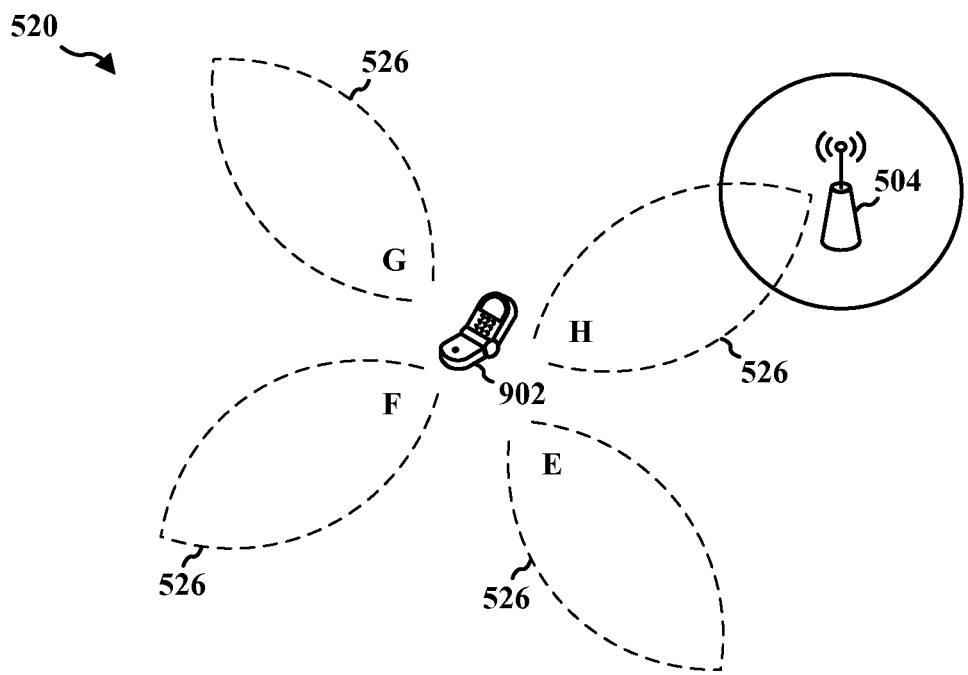

FIGS. 5A and 5B are diagrams illustrating an example of the transmission of beamformed signals between a CP and a UE. The CP may be embodied as a BS in a mmW system (mmW BS). Referring to FIG. 5A, diagram 500 illustrates a CP 504 of a mmW system transmitting beamformed signals 506 (e.g., synchronization signals or discovery signals) in different transmit directions (e.g., directions A, B, C, and D). In an example, the CP 504 may sweep through the transmit directions according to a sequence A-B-C-D. In another example, the CP 504 may sweep through the transmit directions according to the sequence B-D-A-C. Although only four transmit directions and two transmit sequences are described with respect to FIG. 5A, any number of different transmit directions and transmit sequences are contemplated.

After transmitting the signals, the CP 504 may switch to a receive mode. In the receive mode, the CP 504 may sweep through different receive directions in a sequence or pattern corresponding (mapping) to a sequence or pattern in which the CP 504 previously transmitted the synchronization/discovery signals in the different transmit directions. For example, if the CP 504 previously transmitted the synchronization/discovery signals in transmit directions according to the sequence A-B-C-D, then the CP 504 may sweep through receive directions according to the sequence A-B-C-D in an attempt to receive an association signal from a UE 502. In another example, if the CP 504 previously transmitted the synchronization/discovery signals in transmit directions according to the sequence B-D-A-C, then the CP 504 may sweep through receive directions according to the sequence B-D-A-C in an attempt to receive the association signal from the UE 502.

A propagation delay on each beamformed signal allows a UE 502 to perform a receive (RX) sweep. The UE 502 in a receive mode may sweep through different receive directions in an attempt to detect a synchronization/discovery signal 506 (see FIG. 5B). One or more of the synchronization/discovery signals 506 may be detected by the UE 502. When a strong synchronization/discovery signal 506 is detected, the UE 502 may determine an optimal transmit direction of the CP 504 and an optimal receive direction of the UE 502 corresponding to the strong synchronization/discovery signal. For example, the UE 502 may determine preliminary antenna weights/directions of the strong synchronization/discovery signal 506, and may further determine a time and/or resource where the CP 504 is expected to optimally receive a beamformed signal. Thereafter, the UE 502 may attempt to associate with the CP 504 via a beamformed signal.

Referring to diagram 520 of FIG. 5B, the UE 502 may listen for beamformed discovery signals in different receive directions (e.g., directions E, F, G, and H). In an example, the UE 502 may sweep through the receive directions according to a sequence E-F-G-H. In another example, the UE 502 may sweep through the receive directions according to the sequence F-H-E-J. Although only four receive directions and two receive sequences are described with respect to FIG. 5B, any number of different receive directions and receive sequences are contemplated.

The UE 502 may attempt the association by transmitting beamformed signals 526 (e.g., association signals) in the different transmit directions (e.g., directions E, F, G, and H). In an aspect, the UE 502 may transmit an association signal 526 by transmitting along the optimal receive direction of the UE 502 at the time/resource where the CP 504 is expected to optimally receive the association signal. The CP 504 in the receive mode may sweep through different receive directions and detect the association signal 526 from the UE 502 during one or more timeslots corresponding to a receive direction. When a strong association signal 526 is detected, the CP 504 may determine an optimal transmit direction of the UE 502 and an optimal receive direction of the CP 504 corresponding to the strong association signal. For example, the CP 504 may determine preliminary antenna weights/directions of the strong association signal 526, and may further determine a time and/or resource where the UE 502 is expected to optimally receive a beamformed signal. Any of the processes discussed above with respect to FIGS. 5A and 5B may be refined or repeated over time such that the UE 502 and CP 504 eventually learn the most optimal transmit and receive directions for establishing a link with each other. Such refinement and repetition may be referred to as beam training.

In an aspect, the CP 504 may choose a sequence or pattern for transmitting the synchronization/discovery signals according to a number of beamforming directions. The CP 504 may then transmit the signals for an amount of time long enough for the UE 502 to sweep through a number of beamforming directions in an attempt to detect a synchronization/discovery signal. For example, a CP beamforming direction may be denoted by n, where n is an integer from 0 to N, N being a maximum number of transmit directions. Moreover, a UE beamforming direction may be denoted by k, where k is an integer from 0 to K, K being a maximum number of receive directions. When the UE 502 detects a synchronization/discovery signal from the CP 504, the UE 502 may discover that the strongest synchronization/discovery signal is received when the UE 502 beamforming direction is k=2 and the CP 504 beamforming direction is n=3. Accordingly, the UE 502 may use the same antenna weights/directions for responding (transmitting a beamformed signal) to the CP 504 in a corresponding response timeslot. That is, the UE 502 may send a signal to the CP 504 using UE 502 beamforming direction k=2 during a timeslot when the CP 504 is expected to perform a receive sweep at CP 504 beamforming direction n=3.

The present disclosure provides a method and apparatus for utilizing a wireless device's physical orientation and user interaction sensor information (e.g., information determined via gyroscopes, accelerometers, touch screens, and/or proximity sensors) to aid multiple antenna beamforming processes at the wireless device. A mmW system operating at carrier frequencies significantly higher than most microwave wireless systems must deal with the existence of increased pathloss before data communication can occur. The increased pathloss may be overcome by leveraging multiple antennas or antenna arrays for sending a signal to yield a beamforming array gain. However, a short wavelength at such carrier frequencies causes signal propagation to be sparse in scattering. That is, channels may typically be comprised of a small number of specular paths, or paths with limited angular spread. As a result of reduced scattering, channel correlation increases and signal propagation appears geometric.

In contrast with beamforming in a multipath-dense environment, wherein abstract mathematical approaches to beamforming may be applied (e.g., maximum ratio transmission, minimum mean square error (MMSE) beamforming, and other channel decomposition based solutions), beamforming at higher carriers leverages a geometric structure of channels to point phased antenna arrays at a specific physical angle in space. Accordingly, spatial awareness may be more significant at higher carriers than is typically the case at lower carriers. In an aspect, devices may include one or more sensors that can assist in spatially-aware communication. Examples of such sensors include gyroscopes and accelerometers (e.g., used for gaming, etc.) and GPS receivers (e.g. used for localization). In an aspect, the present disclosure provides for using one or more device sensors to effectively augment a mobile device's channel estimation procedure and aid in spatially-aware beamforming in propagation paths that exhibit a high level of correlation due to sparse and/or specular scattering.

Figure 6:
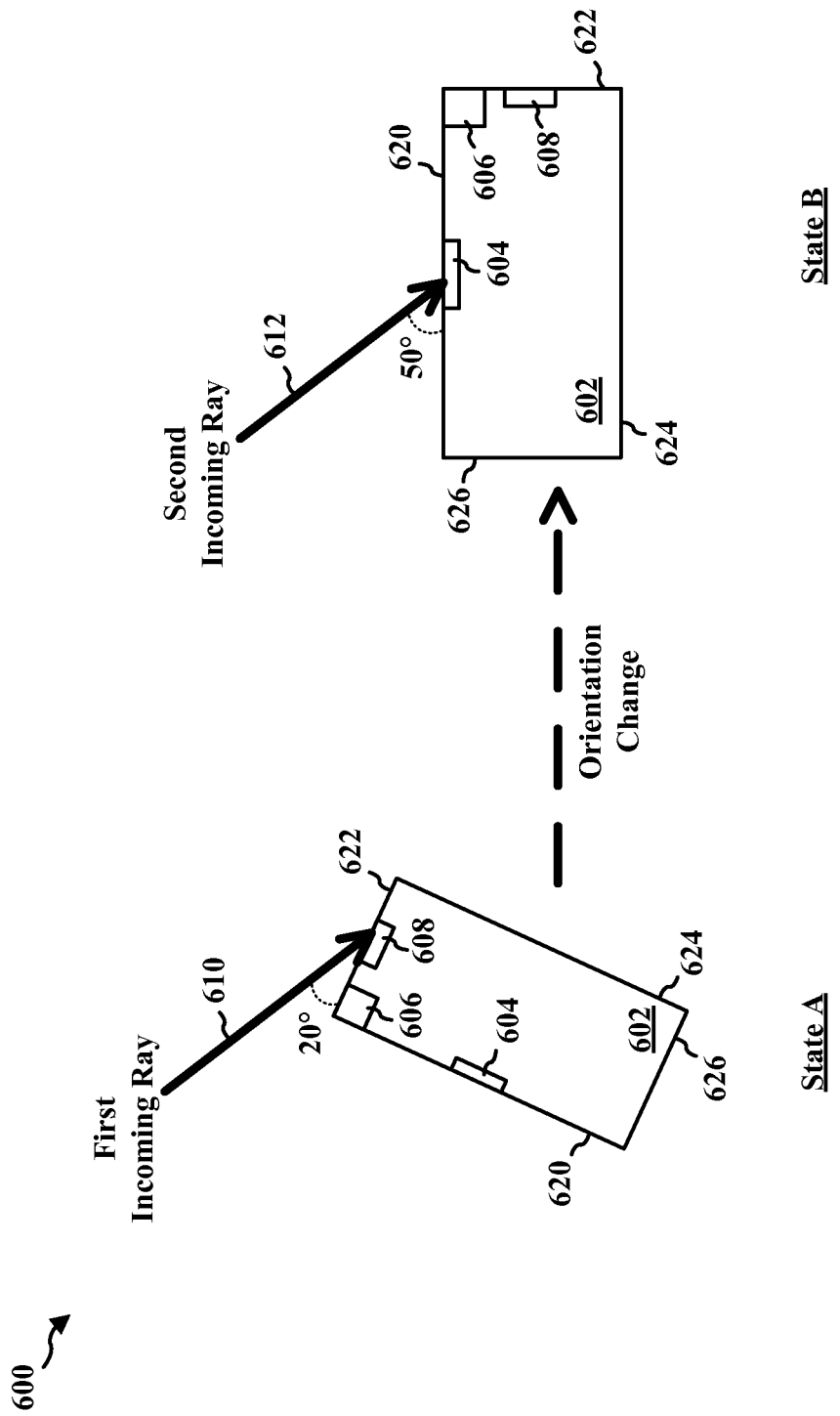
FIG. 6 is a diagram illustrating a UE beamforming process with respect to a change in physical orientation.

FIG. 6 is a diagram 600 illustrating a UE beamforming process with respect to a change in physical orientation. In an aspect, device sensors used to estimate a position and orientation of a UE 602 can also be used to aid a beamforming process when an orientation/location of the UE 602 changes. The UE 602 may include an antenna array having a number of sub-arrays located at various locations. For example, a first sub-array 604 may be located at a first long edge 620 of the UE 602 and a third sub-array 608 may be located at a first short edge 622 of the UE 602. A second sub-array 606 may be located at a corner of the first long edge 620 and the first short edge 622. In an aspect, some edges (e.g., second long edge 624 and second short edge 626) of the UE 602 may not have any sub-arrays located thereon. In an aspect, the UE 602 may be embodied as a hand held device operating at a high carrier frequency and may estimate a propagation channel characteristic by leveraging training data sent by a CP (not shown) with which the UE 602 is communicating.

The UE 602 may determine an ideal physical direction for communicating (transmitting and/or receiving) data to and from the CP. For example, the ideal physical direction may be a direction at which the UE 602 is able to communicate a signal with a highest signal-to-interference-plus-noise ratio (SINR). Referring to FIG. 6, the UE 602 having the physical orientation shown in State A may determine that an ideal angle for beamforming is the angle at which a first incoming ray 610 is incident upon an antenna array (e.g., third sub-array 608) located at the first short edge 622 of the UE 602. In State A, the first incoming ray 610 is incident upon the third sub-array 608 at an angle of 20° off of end-fire (80° off of broadside). Accordingly, for State A the ideal angle for beamforming is 20° off of end-fire relative to the first sub-array 608 located at the first short edge 622.

As shown in State B, a position of the UE 602 has rotated 70° clockwise. When the position or orientation of the UE 602 changes, the UE 602 may utilize a device sensor (e.g., gyroscope, accelerometer, etc.) to detect the orientation change. Moreover, the UE 602 may determine that the ideal angle for beamforming is now the angle at which a second incoming ray 612 is incident upon an antenna array (e.g., first sub-array 604) located at the first long edge 620 of the UE 602. The first incoming ray 610 and the second incoming ray 612 may be the same ray or different rays. In State B, the second incoming ray 612 is incident upon the first sub-array 604 at an angle of 50° off of end-fire. Accordingly, for State B the ideal angle for beamforming is 50° off of end-fire relative to the first sub-array 604 located at the first long edge 620.

In an aspect, the UE 602 may use knowledge of its physical orientation and the ideal angle for beamforming to activate communication (reception/transmission) via a sub-array that is most suited to receive/transmit in a dominant direction (e.g., direction yielding highest SINR). Referring to FIG. 6, when the UE 602 is physically oriented as in State B, the most-suited antenna sub-array for receiving/transmitting in the dominant direction may be the first sub-array 604 located at the first long edge 620 and not the third sub-array 608 located at the first short edge 622.

In a further aspect, the UE 602 may configure/update beamforming weights (antenna weights) of the first sub-array 604 to steer towards a desired direction after the change in physical orientation is detected. As shown in FIG. 6, the desired direction corresponds to the angle 50° off of end-fire. Accordingly, the beamforming weights of the first sub-array 604 may be configured to point in the direction corresponding to the angle 50° off of end-fire. The beamforming weights may be exact weights calculated to steer the first sub-array 604 in the desired direction, or a codeword (e.g., from a beamforming codebook) known to roughly steer the first sub-array 604 in the desired direction.

In an aspect, a mapping between physical orientation changes and beamforming weight configurations may not be previously known to the UE 602. Accordingly, the UE 602 may learn the mapping in an online manner. For example, at State A, the UE 602 may use a first set of antenna weights (beamforming vector $v_1$) on the third sub-array 608 to communicate a signal. The UE 602 may then rotate a number of degrees (e.g., 75°) to State B. However, at State B, the UE may be unaware of a dominant direction (e.g., direction yielding highest SINR) for communicating the signal. Accordingly, the UE 602 may perform a beam sweep to discover the dominant direction. Based on the discovered dominant direction, the UE 602 may determine that a second set of antenna weights (beamforming vector $v_2$) on the first sub-array 604 is ideal for communicating the signal while physically oriented according to State B.

In an aspect, the UE 602 may map the determined beamforming vector $v_2$ to the beamforming vector $v_1$ and the change in physical orientation (e.g., rotated by 75°). The mapping may be stored in a memory of the UE 602 for future use. For example, when the UE 602 later uses the beamforming vector $v_1$ on the third sub-array 608 for signal communication at a first state (e.g., State A), and detects the change in physical orientation (e.g., rotated by 75°) to a second state (e.g., State B), the UE 602 may refer to the stored mapping to determine that the beamforming vector $v_2$ on the first sub-array 604 may be used for signal communication at the second state. Hence, the UE 602 is saved from having to again determine an appropriate beamforming vector for communication at the second state, thus preserving resources. In another aspect, the determined beamforming vector $v_2$ may be used in a more involved machine learning process that determines a mapping between codeword transformations and orientation changes.

In a further aspect, the UE 602 may use other types of device sensors to aid channel estimation and beamforming. For example, the UE 602 may use information regarding a user's interaction with a device touch screen to determine how the user holds the UE 602 (e.g., determine the likelihood of the user being in one of different "hand grip" configurations). By knowing how the user holds the UE 602, the UE 602 may determine whether certain sub-arrays (e.g., first sub-array 604, second sub-array 606, and/or third sub-array 608) are blocked from communication due to the user's hand. Accordingly, the UE 602 may use such information to improve a beamforming process. For example, the UE 602 may perform a beam sweep or beam test using sub-arrays that are not expected to be blocked.

In another example, the UE 602 may include a proximity sensor that detects whether the UE 602 is placed against the user's head and/or ear. The sensor may typically be used to turn a device screen off and save power. In an embodiment, the same sensor can be used to turn off (cease further use of) a sub-array designed to radiate out of a front surface (opposite the user's head and/or ear) of the UE 602. Thus, channel estimation and beam training overhead may be reduced.

In a further example, antenna sub-arrays may be augmented with touch sensors that directly detect whether a sub-array is blocked. Accordingly, when a touch sensor is touched by a user, the UE 602 may definitively know that a corresponding sub-array is blocked. The UE 602 may then decide whether to use the blocked sub-array for communication.

Figure 7:
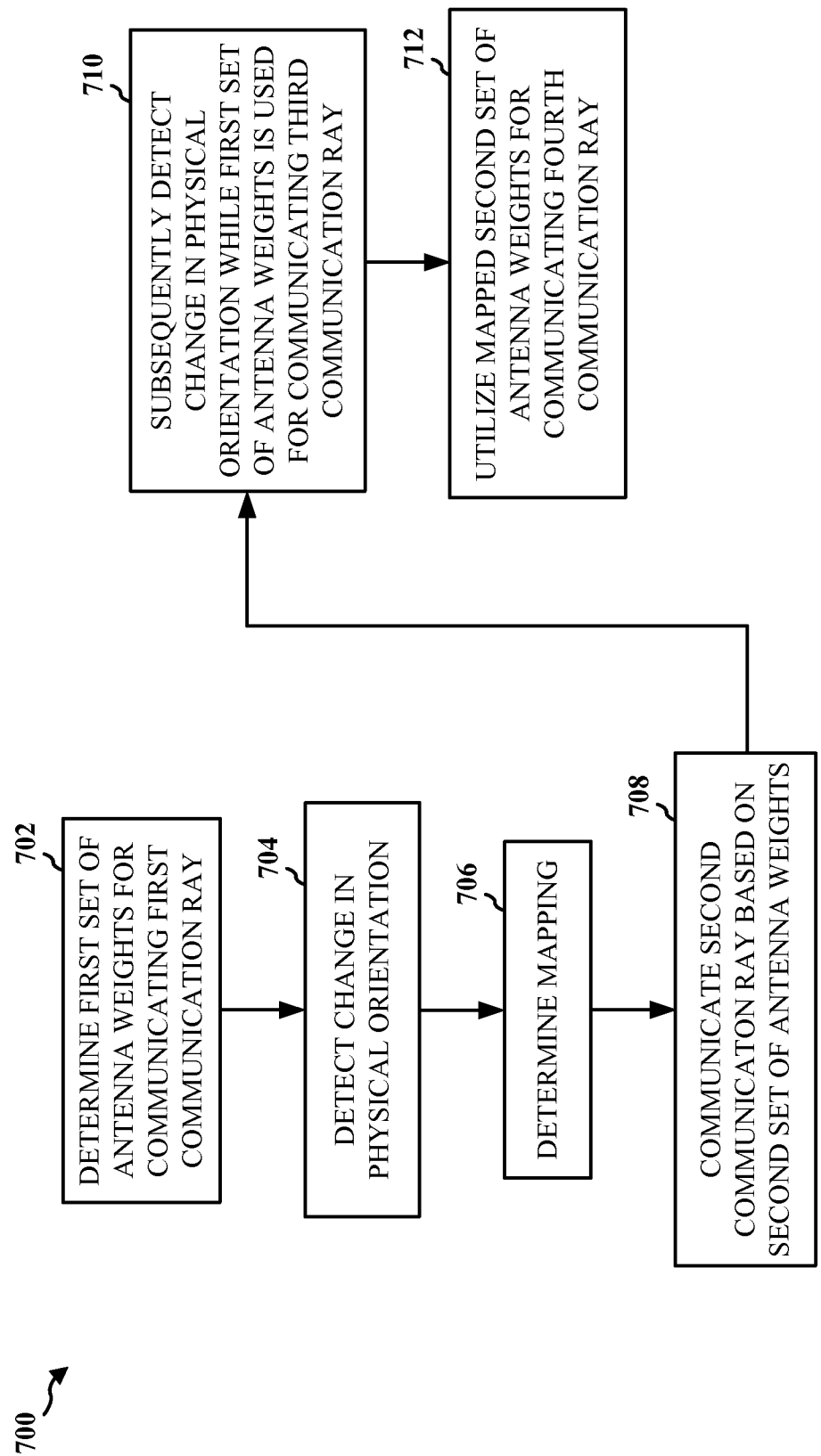
FIG. 7 is a flow chart of a method of wireless communication.

FIG. 7 is a flow chart 700 of a method of wireless communication. The method may be performed by a device (e.g., UE 602). At step 702, the device determines a first set of antenna weights for communicating a first communication ray. Here, the communicating may include transmitting and/or receiving the first communication ray. At step 704, the device detects a change in a physical orientation of the device. The change in the physical orientation may be detected via a device sensor.

At step 706, the device determines a mapping between the first set of antenna weights, the detected change in the physical orientation, and a second set of antenna weights for communicating a second communication ray. The first communication ray and the second communication ray may be the same ray. Alternatively, the first communication ray and the second communication ray are different rays.

In an aspect, the device determines the mapping by first performing a directional beam sweep to determine a beam direction of the second communication ray after the change in the physical orientation is detected. Thereafter, the device determines the second set of antenna weights based on the determined beam direction. The device then maps the determined second set of antenna weights to the first set of antenna weights and the change in the physical orientation. Additionally or alternatively, the device determines the mapping from a beamforming codebook that has previously mapped the determined first set of antenna weights and the detected physical orientation change to the second set of antenna weights.

At step 708, the device communicates the second communication ray based on the second set of antenna weights. The communicating may include transmitting and/or receiving the second communication ray.

In an aspect, the first communication ray is communicated via at least one antenna and the second communication ray is communicated via at least one other antenna. Moreover, the at least one antenna may be positioned on at least one portion of the device and the at least one other antenna may be positioned on at least one other portion of the device. Accordingly, referring back to step 706, the device may determine the mapping by detecting that an antenna of the at least one other antenna is blocked from communicating the second communication ray, and thereafter decide not to determine an antenna weight corresponding to the blocked antenna for communicating the second communication ray. The blocked antenna may be detected via a device proximity sensor or a device touch sensor.

At step 710, the device may subsequently detect the change in the physical orientation while the first set of antenna weights is used for communicating a third communication ray. Accordingly, at step 712, the device may utilize the mapped second set of antenna weights for communicating a fourth communication ray when the change in the physical orientation is subsequently detected. The third communication ray and the fourth communication ray may be the same ray. Alternatively, the third communication ray and the fourth communication ray are different rays.

Figure 8:
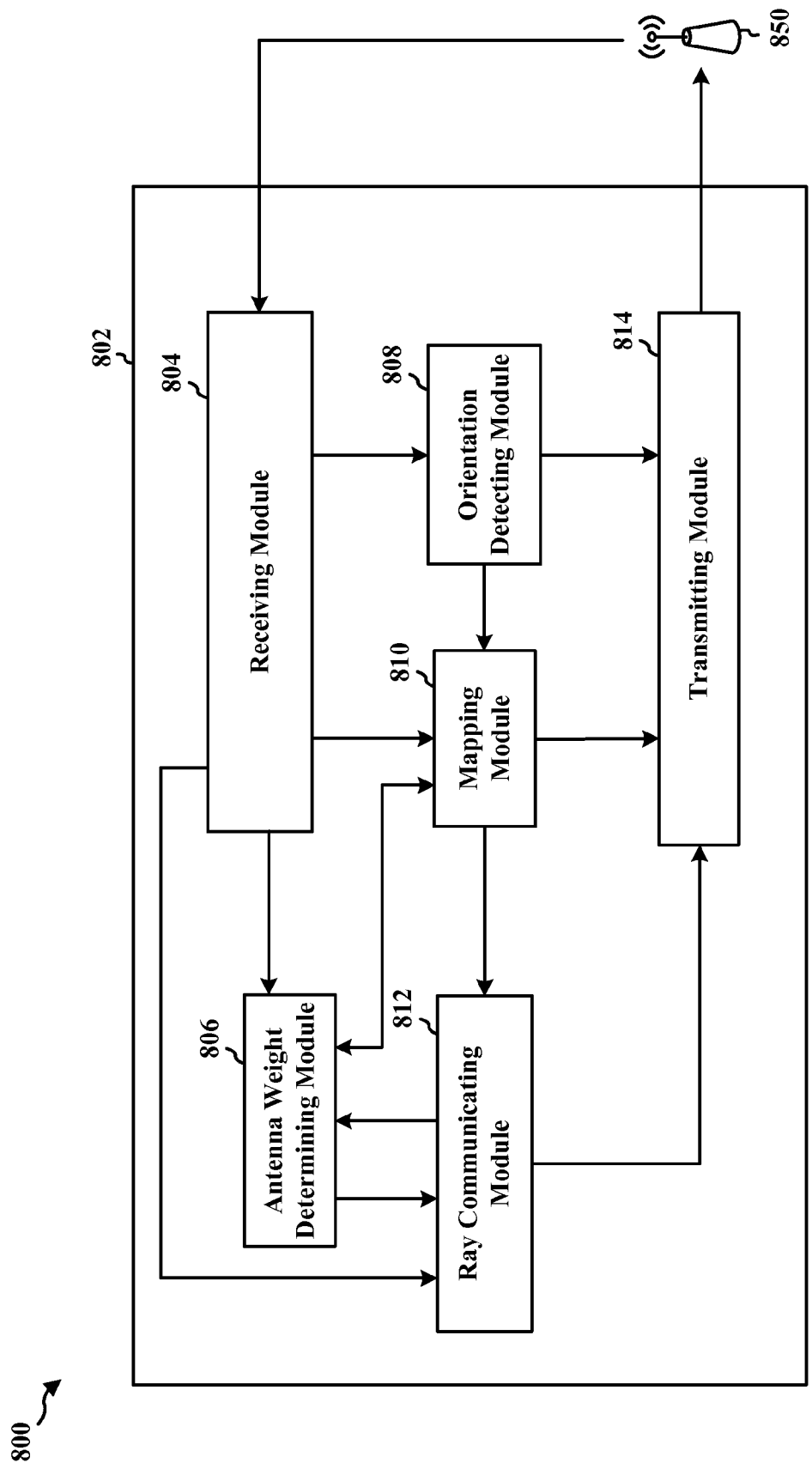
FIG. 8 is a data flow diagram illustrating the data flow between different modules/means/components in an exemplary apparatus.

FIG. 8 is a conceptual data flow diagram 800 illustrating the data flow between different modules/means/components in an exemplary apparatus 802. The apparatus may be a UE (e.g., UE 602). The apparatus includes a receiving module 804, a antenna weight determining module 806, an orientation determining module 808, a mapping module 810, a ray communicating module 812, and a transmitting module 814.

The antenna weight determining module 806 determines a first set of antenna weights for communicating a first communication ray. Here, communicating the first communication ray may include the ray communicating module 812 receiving (via the receiving module 804) the first communication ray from, and/or transmitting (via the transmitting module 814) the first communication ray to, a CP 850. The orientation detecting module 808 detects a change in a physical orientation of the apparatus 802. The orientation detecting module 808 may detect the change in the physical orientation via an apparatus sensor.

The mapping module 810 determines a mapping between the first set of antenna weights, the detected change in the physical orientation, and a second set of antenna weights for communicating a second communication ray. The first communication ray and the second communication ray may be the same ray. Alternatively, the first communication ray and the second communication ray are different rays.

In an aspect, the mapping module 810 determines the mapping by first performing a directional beam sweep to determine a beam direction of the second communication ray after the change in the physical orientation is detected. Thereafter, the mapping module 810 determines the second set of antenna weights based on the determined beam direction. The mapping module 810 then maps the determined second set of antenna weights to the first set of antenna weights and the change in the physical orientation. Additionally or alternatively, the mapping module 810 determines the mapping from a beamforming codebook that has previously mapped the determined first set of antenna weights and the detected physical orientation change to the second set of antenna weights.

The ray communicating module 812 communicates the second communication ray based on the second set of antenna weights. Communicating the second communication ray may include the ray communicating module 812 receiving (via the receiving module 804) the second communication ray from, and/or transmitting (via the transmitting module 814) the second communication ray to, the CP 850.

In an aspect, the first communication ray is communicated via at least one antenna and the second communication ray is communicated via at least one other antenna. Moreover, the at least one antenna may be positioned on at least one portion of the apparatus 802 and the at least one other antenna may be positioned on at least one other portion of the apparatus 802. Accordingly, the mapping module 810 may determine the mapping by detecting that an antenna of the at least one other antenna is blocked from communicating the second communication ray, and thereafter decide not to determine an antenna weight corresponding to the blocked antenna for communicating the second communication ray. The mapping module 810 may detect the blocked antenna via a device proximity sensor or a device touch sensor.

The orientation detecting module 808 may subsequently detect the change in the physical orientation while the first set of antenna weights is used by the ray communication module 812 for communicating a third communication ray. Accordingly, the mapping module 810 and/or the ray communicating module 812 may utilize the mapped second set of antenna weights for communicating a fourth communication ray when the change in the physical orientation is subsequently detected. The third communication ray and the fourth communication ray may be the same ray. Alternatively, the third communication ray and the fourth communication ray are different rays.

The apparatus may include additional modules that perform each of the steps of the algorithm in the aforementioned flow chart of FIG. 7. As such, each step in the aforementioned flow chart of FIG. 7 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 9:
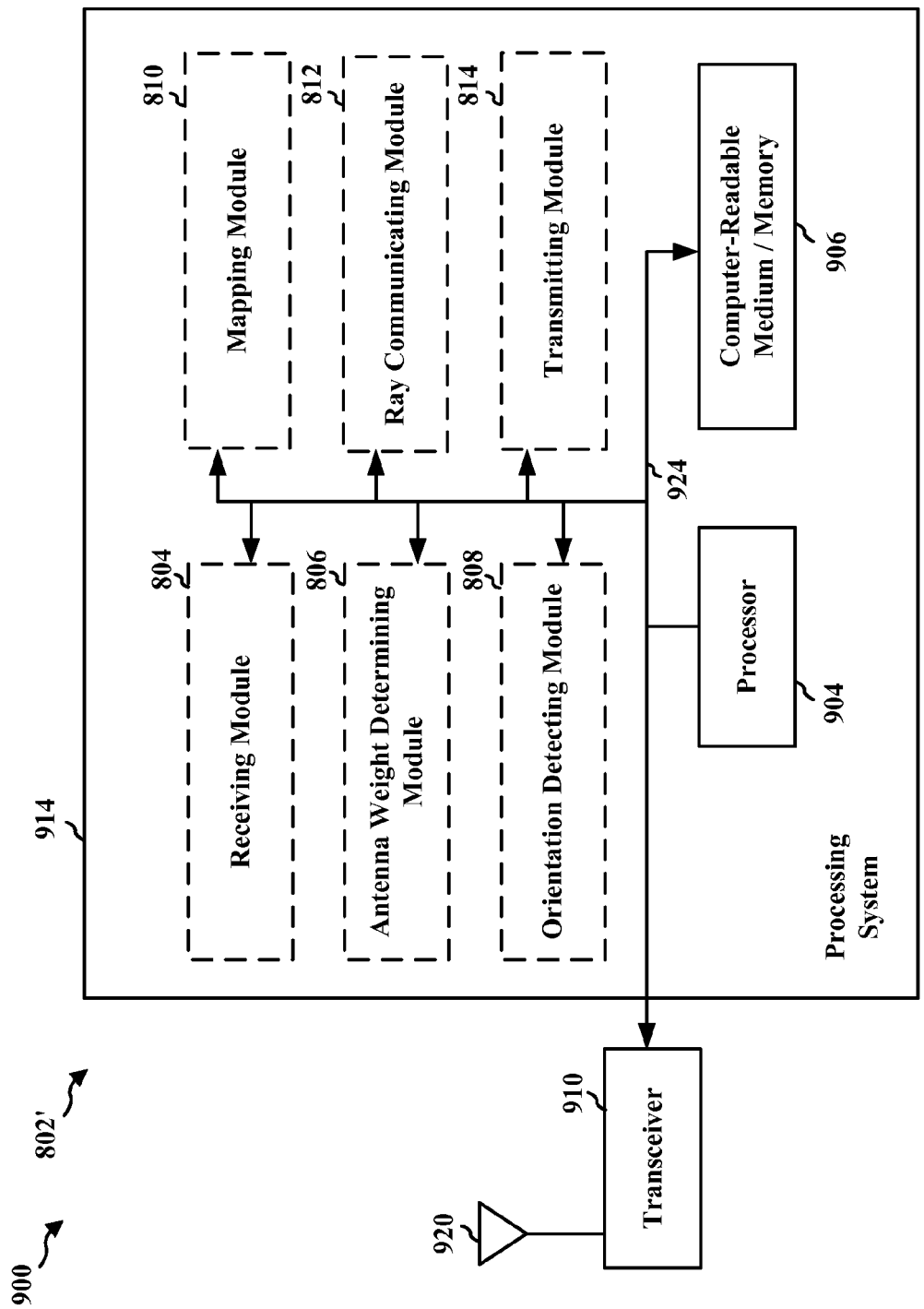
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware modules, represented by the processor 904, the modules 804, 806, 808, 810, 812, 814, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the receiving module 804. In addition, the transceiver 910 receives information from the processing system 914, specifically the transmitting module 814, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system further includes at least one of the modules 804, 806, 808, 810, 812, and 814. The modules may be software modules running in the processor 904, resident/stored in the computer readable medium/memory 906, one or more hardware modules coupled to the processor 904, or some combination thereof. The processing system 914 may be a component of the UE 350 and may include the memory 360 and/or at least one of the TX processor 368, the RX processor 356, and the controller/processor 359.

In one configuration, the apparatus 802/802' for wireless communication includes means for determining a first set of antenna weights for communicating a first communication ray, means for detecting a change in a physical orientation of the device, means for determining a mapping between the first set of antenna weights, the detected change in the physical orientation, and a second set of antenna weights for communicating a second communication ray, means for communicating the second communication ray based on the second set of antenna weights, means for subsequently detecting the change in the physical orientation while the first set of antenna weights is used for communicating a third communication ray, and means for utilizing the mapped second set of antenna weights for communicating a fourth communication ray when the change in the physical orientation is subsequently detected.

The aforementioned means may be one or more of the aforementioned modules of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at a device, comprising:
    determining a first set of antenna weights for communicating a first communication ray, the first set of antenna weights associated with a first antenna sub-array of the wireless communication device;
    detecting a change in a physical orientation of the device;
    determining a mapping between the first set of antenna weights, the detected change in the physical orientation, and a second set of antenna weights for communicating a second communication ray, the second set of antenna weights associated with a second antenna sub-array of the wireless communication device that is different from the first antenna sub-array; and
    communicating the second communication ray based on the second set of antenna weights.

2. The method of claim 1, wherein the first communication ray and the second communication ray are the same ray.

3. The method of claim 1, wherein the first communication ray and the second communication ray are different rays.

4. The method of claim 1, wherein the change in the physical orientation is detected via a device sensor.

5. The method of claim 1, wherein the determining the mapping comprises:
    performing a directional beam sweep to determine a beam direction of the second communication ray after the change in the physical orientation is detected;
    determining the second set of antenna weights based on the determined beam direction; and
    mapping the determined second set of antenna weights to the first set of antenna weights and the change in the physical orientation.

6. The method of claim 5, further comprising:
    subsequently detecting the change in the physical orientation while the first set of antenna weights is used for communicating a third communication ray; and
    utilizing the mapped second set of antenna weights for communicating a fourth communication ray when the change in the physical orientation is subsequently detected.

7. The method of claim 5, wherein the first communication ray is communicated via at least one antenna and the second communication ray is communicated via at least one other antenna.

8. The method of claim 7, wherein the at least one antenna is positioned on at least one portion of the device and the at least one other antenna is positioned on at least one other portion of the device.

9. The method of claim 7, wherein the determining the mapping further comprises:
    detecting that an antenna of the at least one other antenna is blocked from communicating the second communication ray; and
    deciding not to determine an antenna weight corresponding to the blocked antenna for communicating the second communication ray.

10. The method of claim 9, wherein the blocked antenna is detected via a device proximity sensor or a device touch sensor.

11. A device for wireless communication, comprising:
    means for determining a first set of antenna weights for communicating a first communication ray, the first set of antenna weights associated with a first antenna sub-array of the device;
    means for detecting a change in a physical orientation of the device;
    means for determining a mapping between the first set of antenna weights, the detected change in the physical orientation, and a second set of antenna weights for communicating a second communication ray, the second set of antenna weights associated with a second antenna sub-array of the device that is different from the first antenna sub-array; and
    means for communicating the second communication ray based on the second set of antenna weights.

12. The device of claim 11, wherein the first communication ray and the second communication ray are the same ray.

13. The device of claim 11, wherein the first communication ray and the second communication ray are different rays.

14. The device of claim 11, wherein the change in the physical orientation is detected via a device sensor.

15. The device of claim 11, wherein the means for determining the mapping is configured to:
    perform a directional beam sweep to determine a beam direction of the second communication ray after the change in the physical orientation is detected;
    determine the second set of antenna weights based on the determined beam direction; and
    map the determined second set of antenna weights to the first set of antenna weights and the change in the physical orientation.

16. The device of claim 15, further comprising:
    means for subsequently detecting the change in the physical orientation while the first set of antenna weights is used for communicating a third communication ray; and
    means for utilizing the mapped second set of antenna weights for communicating a fourth communication ray when the change in the physical orientation is subsequently detected.

17. The device of claim 15, wherein the first communication ray is communicated via at least one antenna and the second communication ray is communicated via at least one other antenna.

18. The device of claim 17, wherein the at least one antenna is positioned on at least one portion of the device and the at least one other antenna is positioned on at least one other portion of the device.

19. The device of claim 17, wherein the means for determining the mapping is further configured to:

detect that an antenna of the at least one other antenna is blocked from communicating the second communication ray; and decide not to determine an antenna weight corresponding to the blocked antenna for communicating the second communication ray.

20. The device of claim 19, wherein the blocked antenna is detected via a device proximity sensor or a device touch sensor.

21. A device for wireless communication, comprising:

a memory; and at least one processor coupled to the memory and configured to:

determine a first set of antenna weights for communicating a first communication ray, the first set of antenna weights associated with a first antenna sub-array of the device, detect a change in a physical orientation of the device, determine a mapping between the first set of antenna weights, the detected change in the physical orientation, and a second set of antenna weights for communicating a second communication ray, the second set of antenna weights associated with a second antenna sub-array of the device that is different from the first antenna sub-array, and communicate the second communication ray based on the second set of antenna weights.

22. The device of claim 21, wherein:

the first communication ray and the second communication ray are the same ray; or the first communication ray and the second communication ray are different rays.

23. The device of claim 21, wherein the change in the physical orientation is detected via a device sensor.

24. The device of claim 21, wherein the at least one processor determines the mapping by:

performing a directional beam sweep to determine a beam direction of the second communication ray after the change in the physical orientation is detected;

determining the second set of antenna weights based on the determined beam direction; and mapping the determined second set of antenna weights to the first set of antenna weights and the change in the physical orientation.

25. The device of claim 24, the at least one processor further configured to:

subsequently detect the change in the physical orientation while the first set of antenna weights is used for communicating a third communication ray; and utilize the mapped second set of antenna weights for communicating a fourth communication ray when the change in the physical orientation is subsequently detected.

26. The device of claim 24, wherein the first communication ray is communicated via at least one antenna and the second communication ray is communicated via at least one other antenna.

27. The device of claim 26, wherein the at least one antenna is positioned on at least one portion of the device and the at least one other antenna is positioned on at least one other portion of the device.

28. The device of claim 26, wherein the at least one processor further determines the mapping by:

detecting that an antenna of the at least one other antenna is blocked from communicating the second communication ray; and deciding not to determine an antenna weight corresponding to the blocked antenna for communicating the second communication ray.

29. The device of claim 28, wherein the blocked antenna is detected via a device proximity sensor or a device touch sensor.

30. A non-transitory computer-readable medium storing computer executable code for wireless communication, comprising code for:

determining a first set of antenna weights for communicating a first communication ray, the first set of antenna weights associated with a first antenna sub-array;

detecting a change in a physical orientation of the device;

determining a mapping between the first set of antenna weights, the detected change in the physical orientation, and a second set of antenna weights for communicating a second communication ray, the second set of antenna weights associated with a second antenna sub-array that is different from the first antenna sub-array; and communicating the second communication ray based on the second set of antenna weights.

* * * * *